Patented Aug. 28, 1934

1,971,329

UNITED STATES PATENT OFFICE 1,971,329

GUM INHIBITOR

William S. Calcott, Penns Grove, N. J., and Herbert W. Walker, Wilmington, Del., assignors, by mesne assignments, to Gasoline Antioxidant Company, Wilmington, Del., a corporation of Delaware No Drawing. Application March 25, 1930, Serial No. 438,897

4 Claims. (Cl. 44—9)

This invention relates to improvement in means for the protection of liquid hydrocarbon products against the formation of insoluble and gummy products, and more particularly to improved materials for use with unsaturated liquid hydrocarbons which may be used as fuels. The improved materials contemplated may protect the liquid hydrocarbons against discoloration.

Liquid hydrocarbons as commercially produced, particularly when prepared by the distillation or cracking of petroleum, possess a tendency to discolor on standing and to form gums and resinous substances. Gasolines produced by the modern cracking processes are extremely complicated mixtures comprising many constituents, the character of these constituents and the relative proportions of different constituents depending upon the source of the crude and the particular cracking process employed. Besides the normal and branched chain paraffines, there are often present substantial percentages of aromatic hydrocarbons. The crude cracked gasoline also always contains unsaturated hydrocarbons, such for example as olefines and diolefines. Although there may be present some compounds containing a triple bond, these are probably not compounds such as may be formed by the polymerization of acetylene, but rather such compounds as may be formed by the isomerization of dienes and having the general formula $C_nH_m$ where $m$ is greater than $n$, but less than $2n+2$. In certain instances unsaturated compounds are intentionally added to gasolines. The gasolines resulting from such additions may or may not have contained unsaturated hydrocarbons before the addition was made. These unsaturated compounds, regardless of how they were incorporated in the gasoline, in the presence of air are capable of oxidation to form a series of products, some of which are resinous or gummy. The diolefines, and more unsaturated hydrocarbons, are particularly easily oxidized. Differences in structure other than the degree of unsaturation cause considerable variation in the tendency to oxidize, but in general the ease of oxidation increases with the degree of unsaturation. The more recent pressure methods of vapor phase cracking result in a considerably higher percentage of diolefines than the older methods, and it has been stated that these products may run as high as 8 to 15% in unrefined gasoline.

It has been necessary to treat the crude products resulting from the more recent cracking processes in some manner to remove the greater part of these more highly unsaturated products. Among these methods of treatment may be mentioned the sulfuric acid treatment and the fuller's earth vapor phase treatment. While these methods of purification may remove the greater part of the highly unsaturated compounds, it is found that many brands of gasoline tend to discolor on storage and to form a certain amount of gum. The gum appears to be a complex mixture of polymerized hydrocarbons, resins, acids, aldehydes, ketones and peroxides. Its formation is distinctly detrimental in all cases. For example, the deposition of gum in gasoline gives a sticky substance which deposits upon the walls and bottom of the container, and which may cause serious trouble if formed or deposited in the fuel system of internal combustion engines. The soluble portion of the gum is also objectionable because of the introduction of a non-volatile component into the gasoline.

This invention has for an object the inhibition of the formation of these insoluble gums and resins, with an attendant improvement in the quality of the hydrocarbon and freedom from the difficulties introduced by the formation of the more or less insoluble and sticky, gummy material, such as irregular flow in the fuel system of internal combustion engines. A further object is to make it possible to use as an internal combustion fuel, liquid hydrocarbons such as gasoline, that contain larger amounts of highly unsaturated compounds than commercially used at present. A product of this sort can be produced at a lower cost, and possesses in certain cases, improved anti-knock properties. Other objects will appear hereinafter.

These objects are accomplished by the present invention in accordance with which primary aromatic amines are added to gasoline or oils having similar characteristics. The addition may be made at any suitable stage of the production of the substance to be preserved. More specifically the invention relates to the use of addition agents which are compounds of the class, R—NH$_2$, where R is an aryl or aralkyl radical, wherein a second amino group may be substituted.

The invention will be readily understood from a consideration of the examples which follow. In these examples the copper dish test has been used. This is a common method of testing gum formation in gasoline and consists in evaporating a 100 cc. sample of the hydrocarbon from a weighed copper dish on a steam bath and determining the weight of the gum residue. This gum residue is taken as an indication of the stability of the hydrocarbon with respect to gum formation.

Example 1

Cracked gasoline treated with 0.5 cc. o-toluidine per 100 cc. gasoline gave 113 mg. gum. In an equal amount of the same gasoline without a stabilizer 359 mg. gum formed.

Example 2

In the presence of 0.03 gm. meta-toluylene diamine 100 cc. cracked gasoline formed 40 mg. gum, whereas 100 cc. of the same gasoline unstabilized gave 254 mg. gum. The inhibition of gum formation was therefore 84% since only 16% as much gum formed in the presence of meta-toluylene diamine as in its absence.

In the broad class of primary aromatic amines which this invention covers, along with the compounds mentioned in the specific examples certain subclasses and specific compounds merit special mention—for example use may be made of: (1) unsubstituted primary aryl amines, in particular para-phenyl-aniline

or (2) alkyl substituted primary aryl amines as o-toluidine

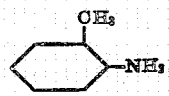

m-toluidine

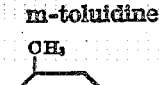

p-toluidine

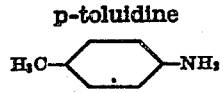

tolyl-anilines

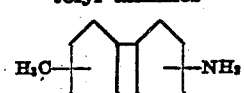

methyl-a-naphthylamines

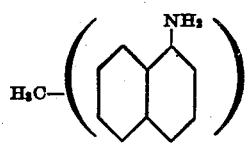

methyl-b-naphthylamines

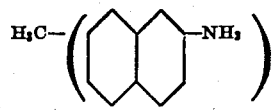

p-amino-ethyl-benzene

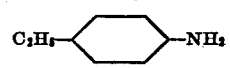

p-amino-isopropyl-benzene

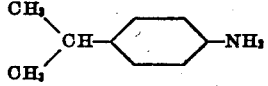

or (3) amino-aryl-amines, such as tri-amino-benzenes

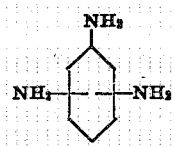

tetra-amino-benzenes

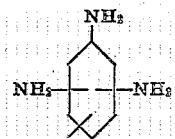

naphthalene diamines

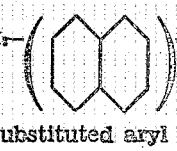

or (4) methyl substituted aryl diamines, for example tolidine

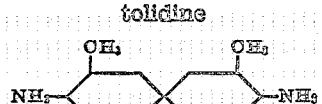

m-toluylene diamine

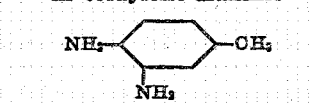

or (5) methoxy substituted aryl diamines, such as dianisidine

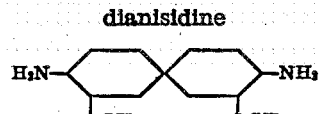

methoxy-phenylene-diamines

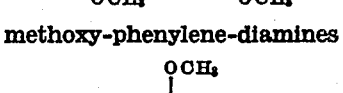

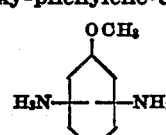

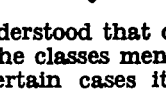

It is to be understood that other isomers and homologues in the classes mentioned above may be used. In certain cases it may be advantageous to use mixtures of two or more of the compounds covered by this invention. It will be appreciated that the examples outlined above and specific compounds mentioned are given merely for the purpose of illustrating the invention and that it is not intended that the invention should be limited to the specific inhibitors named. The concentration of the gum inhibiting agent may vary to secure protection against gumming to a greater or less degree depending upon the nature of the hydrocarbon fuel, the particular inhibitor or inhibitors used, the actual concentration of the inhibitor, the conditions of storage and time of protection desired. Ordinarily the amount of inhibitor incorporated in the gasoline ranges from 0.001 to 0.1% by weight. It will be apparent, however, that this range is not given as limiting since greater amounts may be used in specific instances within the scope of this invention. In most instances no marked advantage is gained by using more than the maximum amount set out above, but in any event the range given appears to be sufficient for the grades of gasoline now on the market.

The materials used herein seem by virtue of their antioxidizing properties to inhibit and check the formation of organic peroxides which catalyze gum formation. By checking this catalysis, it is possible to inhibit a large portion of the undesirable gum.

Obviously this invention is of great importance in freeing internal combustion engines from the annoyance and improper functioning due to the deposition of gum in the fuel containers or fuel systems.

As many apparently widely different embodiments of this invention may be made without departing from the spirit and scope thereof, it is to be understood that we do not limit ourselves to the specific embodiments thereof except as defined in the appended claims.

We claim:

1. Gasoline comprising cracked hydrocarbon spirits normally tending to form gum on storage having incorporated therein in an amount sufficient to inhibit such gum formation a toluylene-di-amine.

2. Gasoline comprising cracked hydrocarbon spirits normally tending to form gum on storage having incorporated therein in an amount sufficient to inhibit such gum formation meta-toluylene-di-amine.

3. The method of preserving cracked hydrocarbon distillates which normally tend to deteriorate and develop gums on storage, by incorporating therein from 0.001% to 0.1% of a toluylene-di-amine to inhibit such deterioration and gum formation.

4. The method of preserving motor fuels comprising cracked gasoline which normally tend to deteriorate and develop gums on storage, by incorporating therein from 0.001% to 0.1% of meta-toluylene-di-amine to inhibit such deterioration and gum formation.

WILLIAM S. CALCOTT.
HERBERT W. WALKER.